Aug. 5, 1958     L. H. LIGHT     2,846,580
OSCILLATOR CIRCUIT ARRANGEMENT
Filed June 8, 1955
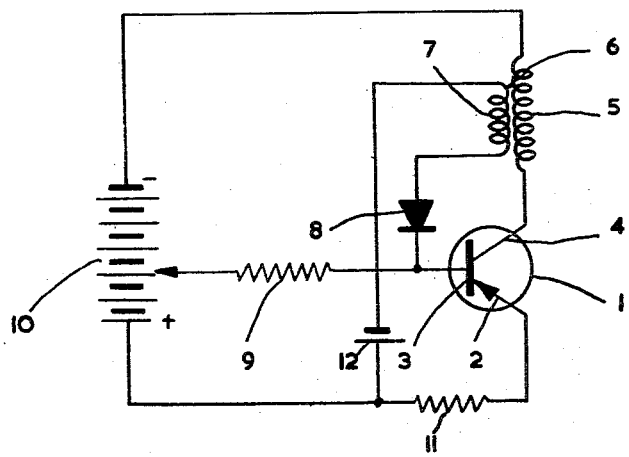
INVENTOR
LEON HENRY LIGHT
BY
AGENT

United States Patent Office 2,846,580
Patented Aug. 5, 1958

2,846,580

OSCILLATOR CIRCUIT ARRANGEMENT

Leon Henry Light, Glasgow, Scotland, assignor, by mesne assignments, to North American Philips Company, Inc., New York, N. Y., a corporation of Delaware Application June 8, 1955, Serial No. 514,079

4 Claims. (Cl. 250—36)

The present invention relates to pulse oscillators. More particularly, the invention relates to pulse oscillators each comprising a transistor, for example, for converting a low direct voltage into a high direct voltage.

It has previously been suggested that a transistor, for example of the PNP type, should be utilized, in a relaxation oscillator circuit in which the emitter is connected to the positive terminal of a direct voltage source, for example of a battery, and the collector is connected by way of the primary winding of a transformer to the negative terminal of the said source; the base being connected via the secondary winding of the transformer in series with a resistor to the emitter.

During the period in which the transistor is conducting, it base current is derived from the oscillation energy of the oscillator, that is, from the voltage which is set up across the secondary winding and whose polarity varies in a pulsatory manner during a short period, causing the transistor to be cut off.

The object of the invention is to provide a transistor pulse oscillator in which the base current is not provided by the oscillation energy produced in the transistor.

According to the invention, between the base and the emitter of the transistor a voltage of a polarity such that the transistor will conduct is supplied by a source of supply, which voltage is periodically overcompensated by a voltage derived from the oscillation energy and produced in a circuit connected parallel to the base-emitter path.

In order that the invention may be readily carried into effect, it will now be described, by way of example, with reference to the accompanying drawing, wherein the single figure is a schematic diagram of an embodiment of the circuit arrangement of the present invention.

The embodiment shown comprises a PNP type junction transistor 1 comprising an emitter 2, a base 3 and a collector 4. The emitter 2 is connected to the positive terminal of a battery 10 of, for example, 3 volts, whereas the collector 4 is connected via the primary winding 5 of a transformer 6 to the negative terminal of the battery 10. The base 3 is connected, on the one hand, by way of a resistor 9 to a tapping on the battery 10 and, on the other hand, by way of a rectifier 8 in series with the secondary winding 7 of transformer 6 to the emitter 2, the cathode of the rectifier 8 being adjacent the base 3.

When the voltage of the battery 10 is applied to the collector 4 via the primary winding 5 and to the base 3 via the resistor 9, the transistor is traversed by a current such that substantially the full voltage of battery 10, say 3 volts, is set up across the primary winding 5. This results in a substantially linear increase of the current traversing the primary winding 5, so that a substantially constant direct voltage appears across the secondary winding 7. The circuit of the transformer 6 is such that the anode of the rectifier 8 is given a negative potential with respect to its cathode, said voltage thus blocking the rectifier. Consequently, the current through the resistor 9 then completely flows to the base 3.

This situation holds till the collector current reaches the knee corresponding to the relative value of the base current in the characteristic curve showing the collector current as a function of the collector voltage with grounded emitter circuit. When this knee is reached, the voltage between the collector and the emitter increases and the collector current no longer increases linearly with time.

This involves a decrease in the negative bias of the anode of rectifier 8, this bias decreasing further till the rectifier 8 becomes conducting. As a result thereof, the base current and hence also the collector current are decreased. The decrease in collector current causes a positive voltage to be set up at the anode of rectifier 8, which voltage reacts upon the collector current, so that the process is of a cumulative nature and the transistor 1 is cut off.

The sudden interruption of the collector current traversing the primary winding 5 results in a high negative voltage being set up at the collector 4. Said voltage may be rectified in order to obtain a direct voltage which may be higher than the voltage of the battery 10. If necessary, the transformer may be provided with a third winding for this purpose.

After the energy accumulated in the primary winding 5 has been consumed, the positive voltage set up at the anode of rectifier 8 disappears, so that at least part of the current traversing resistor 9 again flows through the base circuit. Consequently, the collector current again increases, resulting in a negative voltage at the anode of rectifier 8. The latter is thus cut off, so that the full current traversing the resistor 9 again flows to the base of transistor 1. The cycle is repeated periodically, so that the circuit continuously produces pulses.

The energy derived from the battery 10 and accumulated in the primary winding 5 during each cycle is dependent upon the base current. Said current may be varied by varying the tapping on the battery 10 or the resistor 9.

If it is desirable that better constancy of the base current should be achieved than is possible with the battery 10, which has to supply the collector current, it is possible to provide a separate battery which need supply a comparatively small current only.

By the use of an NPN type junction transistor in which the required reversals of polarity of the battery and of the rectifier must be carried out, the pulse voltages resulting from the transistor being cut off become positive instead of negative.

An additional resistor 11 may be included in series in the circuit of the emitter 2, in order to facilitate, if necessary, the cutting-off of transistor 1. Furthermore, instead of, or in combination with the resistor 11, a low negative voltage from a source 12 may be set up in series with the winding 7 as a threshold voltage of rectifier 8, in order to facilitate rapid transition from the conducting condition to the cut-off condition of the transistor.

What is claimed is:

1. A pulse oscillator circuit arrangement comprising a transistor having emitter, collector and base electrodes, a source of voltage supply, means for applying a first voltage of a polarity such that the transistor will conduct from said source to said base and emitter electrodes, inductive means for deriving a second voltage from the oscillation energy of said pulse oscillator, said oscillation energy being produced in a primary winding connected in the collector circuit of said transistor and said inductive means comprising a secondary winding inductively coupled to said primary winding, and means for combining said first and second voltages comprising a unidirectionally conducting device connected in parallel circuit arrangement between said base and emitter electrodes, said first voltage being periodically overcompensated by said second voltage.

2. A pulse oscillator circuit arrangement comprising a transistor having emitter, collector and base electrodes, a source of voltage supply, means for applying a voltage of a polarity such that the transistor will conduct from said source to said base and emitter electrodes comprising a resistor connected between said source and said base electrode, a transformer having a primary winding and a secondary winding, said primary winding being connected to said collector electrode, a rectifier connected in series circuit arrangement with said secondary winding, and means for connecting said series circuit arrangement in parallel circuit arrangement between said base and emitter electrodes, said rectifier being connected with a polarity such that it will conduct in the conduction direction of said transistor, said rectifier being made nonconducting by the voltage across said secondary winding during the period of conduction of said transistor.

3. A pulse oscillator circuit arrangement comprising a transistor having emitter, collector and base electrodes, a source of voltage supply having two end terminals and an intermediate terminal, means for applying a voltage of a polarity such that the transistor will conduct from said source to said base and emitter electrodes comprising a first resistor connected between said intermediate terminal and said base electrode and a second resistor connected between one of said end terminals and said emitter electrode, a transformer having a primary winding connected between the other of said end terminals and said collector electrode and a secondary winding, a rectifier connected in series circuit arrangement with said secondary winding, and means for connecting said series circuit arrangement in parallel crcuit arrangement between said base and emitter electrodes, said rectifier being connected with a polarity such that it will conduct in the conduction direction of said transistor, said rectifier being made non-conducting by the voltage across said secondary winding during the period of conduction of said transistor.

4. A pulse oscillator circuit arrangement comprising a transistor having emitter, collector and base electrodes, a source of voltage supply having two end terminals and an intermediate terminal, means for applying a voltage of a polarity such that the transistor will conduct from said source to said base and emitter electrodes comprising a first resistor connected between said intermediate terminal and said base electrode and a second resistor connected between one of said end terminals and said emitter electrode, a transformer having a primary winding connected between the other of said end terminals and said collector electrode and a secondary winding, a rectifier, a second source of voltage supply connected in series circuit arrangement with said rectifier and said secondary winding, and means for connecting said series circuit arrangement in parallel circuit arrangement between said base and emitter electrodes, said rectifier being connected with a polarity such that it will conduct in the conduction direction of said transistor, said rectifier being made non-conducting by the voltage across said secondary winding during the period of conduction of said transistor.

References Cited in the file of this patent

UNITED STATES PATENTS 2,708,720     Anderson     May 17, 1955

OTHER REFERENCES

"A Transistorized Audio Oscillator," by Garner, pages 68–69 of Radio and Television News for September 1953.

"Junction Transistor Circuit Applications," by Sulzer, pages 170–173 of Electronics for August 1953.